(12) United States Patent
Chauhan et al.

(10) Patent No.: US 9,648,002 B2
(45) Date of Patent: May 9, 2017

(54) LOCATION-BASED USER DISAMBIGUATION

(71) Applicant: Microsoft Technology Licensing, LLC, Redmond, WA (US)

(72) Inventors: Narender Chauhan, Redmond, WA (US); Benjamin Vincent, Kirkland, WA (US); Tarek B. Kamel, Issaquah, WA (US); Daniel Castro, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 94 days.

(21) Appl. No.: 14/558,994

(22) Filed: Dec. 3, 2014

(65) Prior Publication Data

US 2016/0164850 A1 Jun. 9, 2016

(51) Int. Cl.
*H04L 29/06* (2006.01)
*H04L 29/12* (2006.01)
*H04L 29/08* (2006.01)

(52) U.S. Cl.
CPC .......... *H04L 63/08* (2013.01); *H04L 61/2007* (2013.01); *H04L 63/105* (2013.01); *H04L 63/107* (2013.01); *H04L 67/18* (2013.01)

(58) Field of Classification Search
CPC ..... H04L 63/08; H04L 63/105; H04L 63/107; H04L 67/18; H04L 67/306; H04L 61/2007
USPC ........................................................... 726/7
See application file for complete search history.

(56) References Cited

U.S. PATENT DOCUMENTS

| | | |
|---|---|---|
| 5,757,916 A | 5/1998 | MacDoran et al. |
| 7,006,605 B1 | 2/2006 | Morganstein et al. |
| 7,221,949 B2 | 5/2007 | Clough |
| 7,372,839 B2 | 5/2008 | Relan et al. |
| 7,698,566 B1 | 4/2010 | Stone |
| 8,009,013 B1 | 8/2011 | Hirschfeld et al. |
| 8,220,034 B2 | 7/2012 | Hahn et al. |
| 8,683,609 B2 | 3/2014 | Bravo et al. |

(Continued)

FOREIGN PATENT DOCUMENTS

WO  WO 2013020086 A1  2/2013

OTHER PUBLICATIONS

"How to Make Multiple Usernames Login in Symfony2 and Fosuserbundle", Published on: Sep. 7, 2014, Available at: http://stackoverflow.com/questions/24577853/how-to-make-multiple-usernames-login-in-symfony2-and-fosuserbundle.

(Continued)

*Primary Examiner* — Yogesh Paliwal
(74) *Attorney, Agent, or Firm* — Workman Nydegger

(57) ABSTRACT

Embodiments are directed to validating the identity of a user. In one scenario, a computer system determines that a login account has been created for a user, where the creation includes generation of a first identifier for the user based on a user's determined location at the time of account creation. The computer system next receives a login attempt from the user that includes a second, different identifier and one or more login credentials. The computer system then determines the location from which the login attempt was received and, using the second identifier and the determined login location, identifies the user account corresponding to the user. The computer system further authenticates the user upon determining that the second identifier and login location match the first identifier.

20 Claims, 4 Drawing Sheets

(56) References Cited

U.S. PATENT DOCUMENTS

| | | | |
|---|---|---|---|
| 8,839,453 B2 | 9/2014 | Sanjeev | |
| 2005/0177442 A1* | 8/2005 | Sullivan | G06Q 10/087 |
| | | | 705/16 |
| 2008/0120237 A1* | 5/2008 | Lin | G06Q 20/24 |
| | | | 705/44 |
| 2009/0158404 A1 | 6/2009 | Hahn et al. | |
| 2011/0296513 A1 | 12/2011 | Kasad | |
| 2012/0304260 A1* | 11/2012 | Steeves | G06F 21/31 |
| | | | 726/5 |
| 2014/0187200 A1 | 7/2014 | Reitter et al. | |
| 2015/0358330 A1* | 12/2015 | Stappenbeck | H04L 63/105 |
| | | | 711/145 |

OTHER PUBLICATIONS

"International Search Report and Written Opinion issued in PCT Application No. PCT/US2015/062052", Mailed Date: Feb. 24, 2016, 11 pages.

"International Preliminary Report on Patentability Issued in PCT Application No. PCT/US2015/062052", Mailed Date: Nov. 11, 2016, 7 Pages.

Diwanji, "Detecting Suspicious Account Activity", Official Gmail Blog, Mar. 24, 2010. Available at: https://gmail.googleblog.com/2010/03/detecting-suspicious-account-activity.html.

"Facebook's Suspicious Login Tracking" Security Generation, Oct. 11, 2010. Available at: http://www.securitygeneration.com/security/facebooks-suspicious-login-tracking/.

* cited by examiner

LOCATION-BASED USER DISAMBIGUATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Some software applications or services allow users to access private or other user-specific information by logging to the application or service. Some applications may attempt to determine a user's current location and, if the user's determined location is within an acceptable range (e.g. based on past login behavior), the user will then be permitted to log in to the application.

BRIEF SUMMARY

Embodiments described herein are directed to validating the identity of a user. In one embodiment, a computer system determines that a login account has been created for a user, where the creation includes generation of a first identifier for the user based on a user's determined location at the time of account creation. The computer system next receives a login attempt from the user that includes a second, different identifier and one or more login credentials. The computer system then determines the location from which the login attempt was received and, using the second identifier and the determined login location, identifies the user account corresponding to the user. The computer system further authenticates the user upon determining that the second identifier and login location match the first identifier. Thus, by definitively identifying the user based on the supplied credentials and a determined login location, system security is increased as unauthorized users are prevented from logging in to the system.

In another embodiment, a computer system performs an alternative method for validating the identity of a user. The computer system determines that a login account has been created for a user, where the creation includes generation of a first identifier for the user based on a user's determined location at the time of account creation. The computer system further receives a login attempt from the user that includes a second, different identifier and one or more login credentials. The computer system determines the location from which the login attempt was received and, using the second identifier and the determined login location, identifies the user account corresponding to the user. The computer system further determines that the second identifier and login location do not match the first identifier and prompts the user to provide additional information associated with the user's location at the time of account creation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
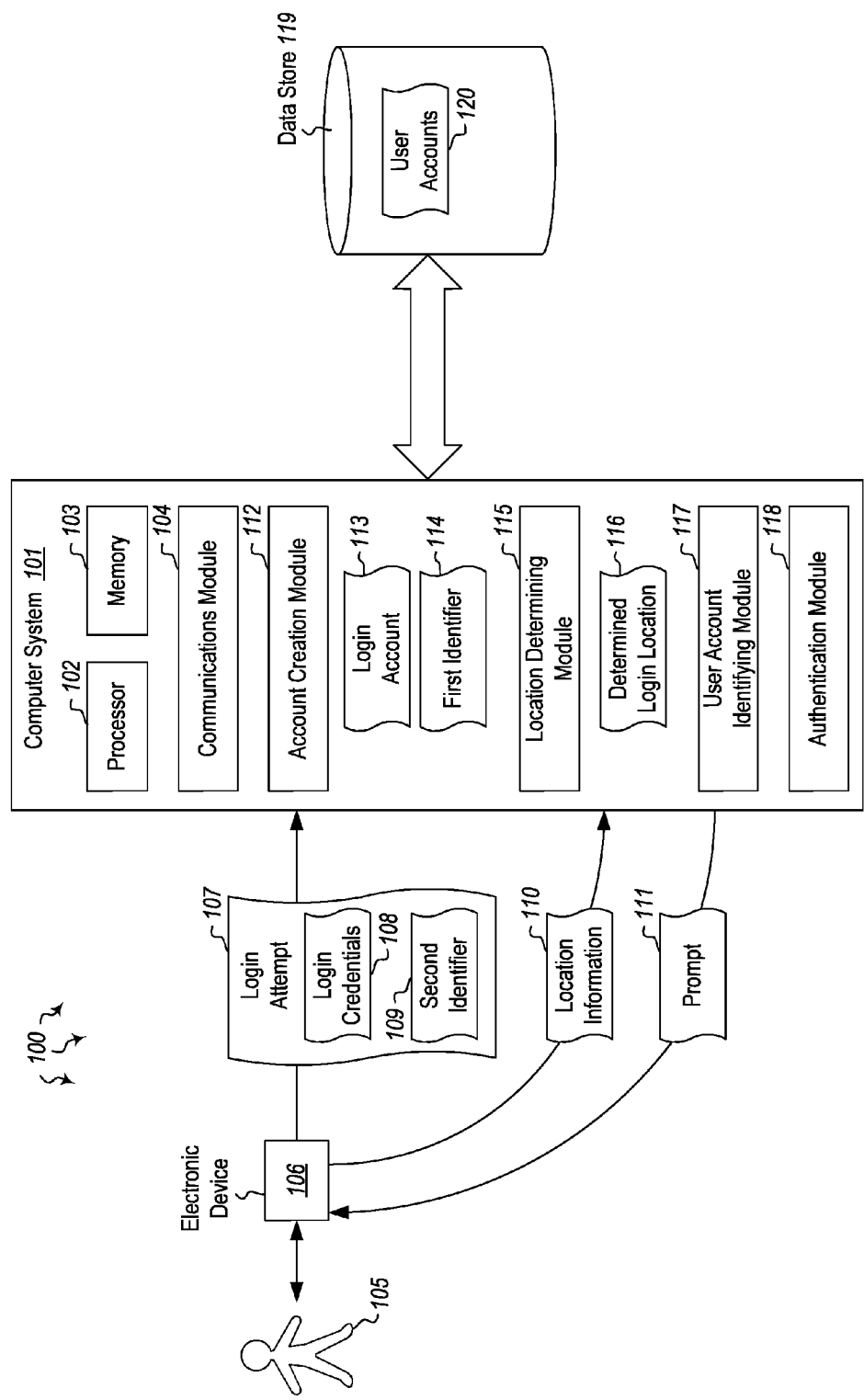
FIG. 1 illustrates a computer architecture in which embodiments described herein may operate including validating the identity of a user.

Embodiments described herein are directed to validating the identity of a user. In one embodiment, a computer system determines that a login account has been created for a user, where the creation includes generation of a first identifier for the user based on a user's determined location at the time of account creation. The computer system next receives a login attempt from the user that includes a second, different identifier and one or more login credentials. The computer system then determines the location from which the login attempt was received and, using the second identifier and the determined login location, identifies the user account corresponding to the user. The computer system further authenticates the user upon determining that the second identifier and login location match the first identifier. Thus, by definitively identifying the user based on the supplied credentials and a determined login location, system security is increased as unauthorized users are prevented from logging in to the system.

In another embodiment, a computer system performs an alternative method for validating the identity of a user. The computer system determines that a login account has been created for a user, where the creation includes generation of a first identifier for the user based on a user's determined location at the time of account creation. The computer system further receives a login attempt from the user that includes a second, different identifier and one or more login credentials. The computer system determines the location from which the login attempt was received and, using the second identifier and the determined login location, identifies the user account corresponding to the user. The computer system further determines that the second identifier and login location do not match the first identifier and prompts the user to provide additional information associated with the user's location at the time of account creation.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

In some embodiments, the communications module 104 is configured to communicate with a data store 119. The data store 119 may be any type of device or combination of devices configured to store data. The data store may include hard disks, solid state drives, hybrid drives, DVDs, Blue Ray disks, or other distributed data stores such as storage area networks (SANs) or cloud storage. The data store 119, while shown as being external to computer system 101, may be internal to computer system 101 or may be external thereto. The data store 119 may store many different types of data including information relating to user accounts. Each user (e.g. user 105) has their own separate login account 113 that includes associated data. The user's login account may provide the user access to various resources, data, services or other information.

In some embodiments, the user's login account 113 provides access to application data. This application data may include data such as email, calendar data, contact information or other types of data. The user may access this data by logging in to their account 113 using login credentials 108. These login credentials 108 are sent as part of a login attempt 107 sent by the user 105. The login credentials may include any kind of textual, biometric, token-based or other types of credentials such as user name and password, fingerprints, iris scans, physical key fob token generators or other types of credentials. The user's login attempt may be sent from any location that has internet access, and may be sent from electronic device 106. The electronic device 106 may be a phone, tablet, laptop, desktop pc, wearable device, or from any type of digital, internet-connected device. In addition to login credentials, the login attempt 107 may also include an identifier 109. This second identifier 109 may be different than a first identifier 114 that is associated with (and potentially stored with) the user's login account 113.

The first identifier 114 may be generated when the user 105 logs in for the first time, or when the user is at a location which they wish to associate with their account. For example, when the user sends their login attempt 107 (or rather, when their electronic device 106 sends the login attempt), location information 110 may also be sent. The location information may explicitly state the current location of the user, or may include information from which the user's current location may be deduced. For instance, the login attempt 107 may include the user's internet protocol (IP) address. This IP address may provide a general location of the user, and in some cases, may provide a fairly specific location of the user. The location determining module 115 of computer system 101 may be used to determine the user's current location based on the received location information 110.

This determined login location 116 may be associated with the user's login account, and stored in data store 119. Then, when the user attempts to log in, the user account identifying module 117 may use the received credentials and the determined login location 116 to definitively identify the user. This ensures that the user is who they say they are, and ensures that only the rightful user is allowed to access the data and/or services provided by their authenticated login. This is juxtaposed with other solutions that receive user login credentials including location information and determine whether the user is authorized to access their account. In such cases, if the user is logging in from a location that is outside of a specified geographic area, then the user is determined to be an invalid user and is denied access. Embodiments described herein, however, use the login credentials 108 and location information 110 to identify the user themselves—that is, to definitively determine who the user is based on the available information.

When the user 105 initially logs in, or is at a location they wish to associate with their account, a first identifier 114 is generated and associated with their login account 113. The first identifier is generated based on the location 116 determined by the location determining module 115. The first identifier 114 is stored with the user's login credentials in user accounts 120. Then, on a subsequent login attempt, the user may provide their login credentials 108 along with a second identifier 109 which may be different than the first identifier 114. In some cases, the second identifier may be a derivate of, or a subset of or a part of the first identifier.

For example, in one embodiment, the first identifier 114 may be a phone number that includes an area code. This first identifier may be provided by user 105 or may be generated by the account creation module 112 at the time of account creation. Continuing this example, the user may attempt to log in using the second identifier which may be a phone number without an area code. Thus, the user 105 may use their phone number to log in to the computer system 101, and may use the short form version of their phone number (i.e. the last seven digits) to log in. The user's location may be determined based on other factors and, in this example, if the user is found to be currently located in the area code within which the account was created, the user will be logged in. These concepts will be explained further below with regard to methods 200 and 300 of FIGS. 2 and 3, respectively.

Figure 2:
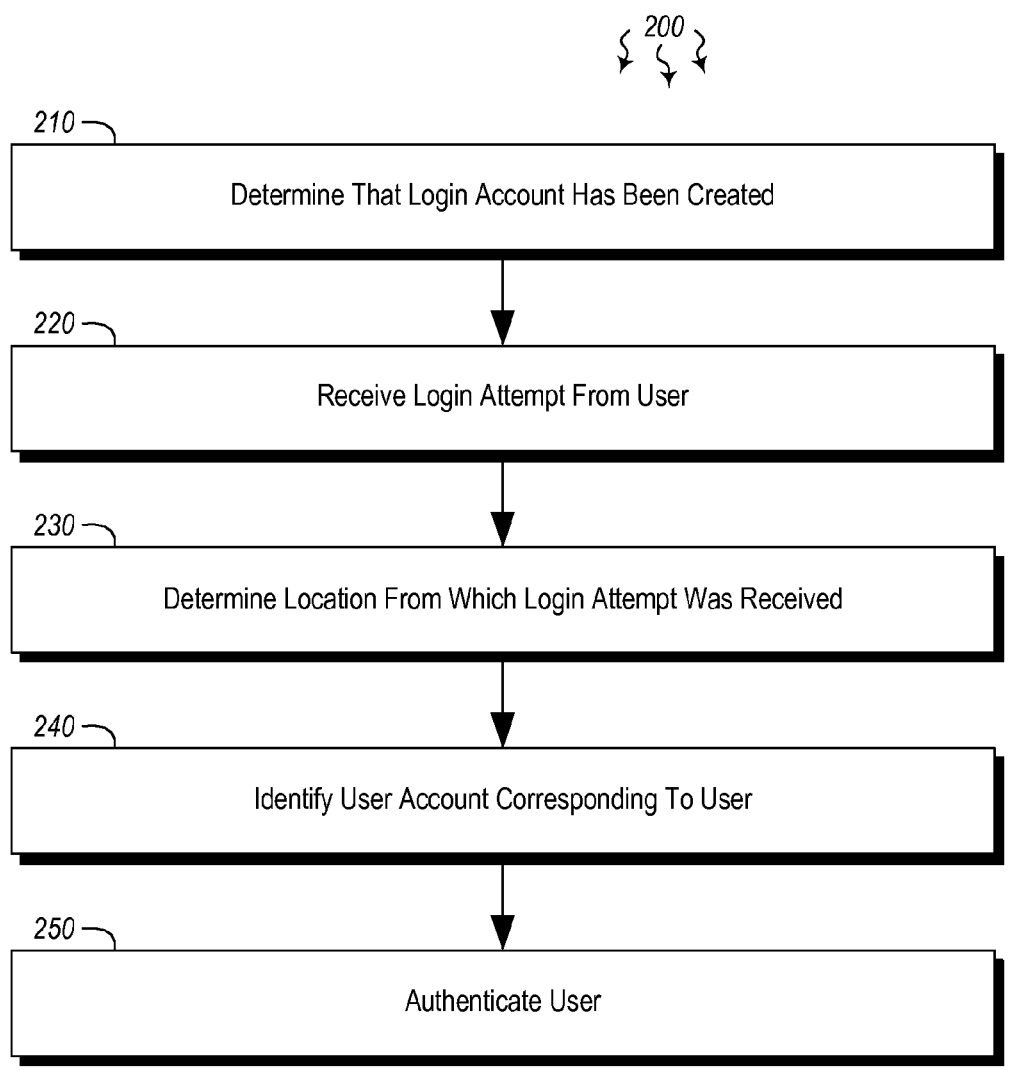
FIG. 2 illustrates a flowchart of an example method for validating the identity of a user.
Figure 3:
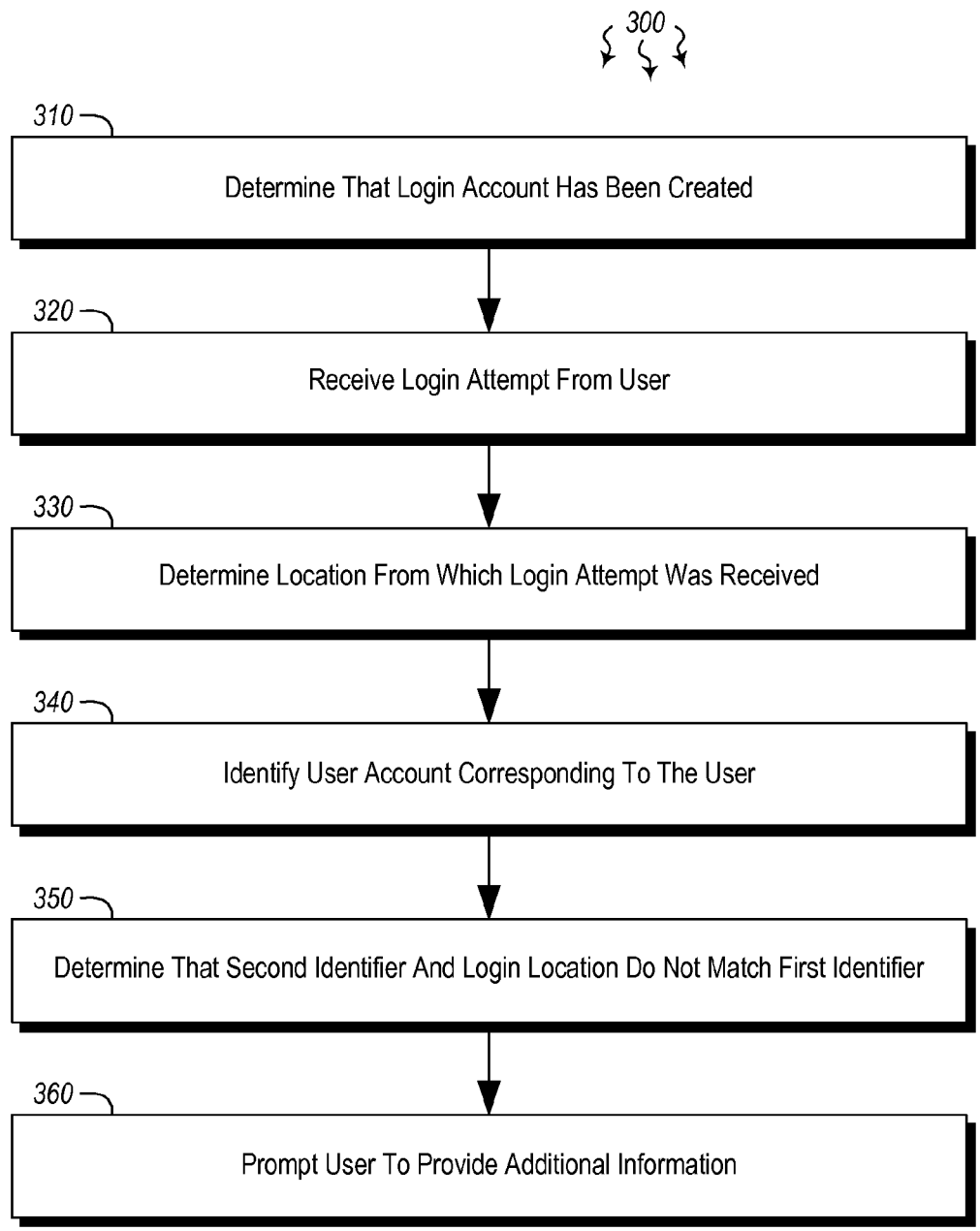
FIG. 3 illustrates a flowchart of an alternative example method for validating the identity of a user.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for validating the identity of a user. The method 200 will now be described with frequent reference to the components and data of environment 100.

Method 200 includes determining that a login account has been created for a user, the creation including generation of a first identifier for the user based on a user's determined location at the time of account creation (210). For example, the computer system 101 may determine that login account 113 has been created for user 105. In some cases, account creation module 112 may create the user's login account, or in other cases, the account may be created on a different computer system. The user's login account may be created as part of interaction with an application accessed by the user, or may be created based on interaction with a website or for other reasons. The creation of the user's login account includes generation of a first identifier 114 which is based on a user's determined location at the time of account creation. As mentioned above, the location determining module 115 may determine the user's location based on a variety of factors and criteria, including location information 110 supplied by the user's electronic device 106. This determined login location 116 may be associated with the login account 113, and may be used in the generation of the first identifier 114.

Method 200 further includes receiving a login attempt from the user that includes a second, different identifier and one or more login credentials (220). The user 105 may send login attempt 107 to computer system 101 where it is received by the communications module 104. The login attempt 107 includes login credentials, including text-based, token-based or biometric credentials, along with a second identifier 109. The second identifier may be different than or the same as the first identifier 114, which was generated based on the user's location at the time of account creation. The first identifier, for example, may be a phone number with country code, and the second identifier may be a phone number without the country code.

For example, the authentication module 118 of computer system 101 may allow users to login using a telephone number as their identifier, along with a password, token or biometric reading. The telephone number may distinguish the user among other users within that user's home country, but may not distinguish the user from users in other countries. Still further, if the user uses the short-form telephone number without an area code for an identifier (e.g. as second identifier 109), the user's login may not distinguish the user from other users in their own country. Thus, in one embodiment, a user's account may be their full phone number including country code, area code, and the final seven digits (in the U.S.). In this example, the first identifier generated for the user's login account would be +1-555-666-7777. The user may subsequently attempt to login using their ten digit phone number with area code as the second identifier 109. The location determining module 115 would determine the user's current location and, if the user were logging in from within the United States, then the second identifier 109 (i.e. the user's ten digit phone number) would match the first identifier+determined login location (U.S. in this case, which gets the +1 country code), and the user would be permitted to login.

In some cases, the location determining module 115 may determine the location from which the login attempt was received (230). In one embodiment, the location determining module 115 may do so based on the area code portion of the phone number. In other cases, the location determining module 115 may determine the user's location based on the internet protocol (IP) address associated with the login attempt. Still further, the location determining module 115 may determine the user's location based on global positioning system (GPS) coordinates, WiFi signals, CDMA signals, Bluetooth signals other signals received from the electronic device 106. The determined login location 116 may be stored with the user's login account information 113, and may be used in generating the first identifier. For instance, in the example above, the country code of the country in which the user is located at the time of account creation may be added as part of the first identifier 114.

Using the second identifier and the determined login location, the user account identifying module 117 of computer system 110 identifies the user account corresponding to the user (240). Then, upon determining that the second identifier and login location match the first identifier, the authentication module 118 authenticates the user (250). Identifying the user account that corresponds to user 105 may thus include determining that the first identifier matches the second identifier combined with the determined login location. Accordingly, if (second identifier 109+determined login location 116)=first identifier 114, then the authentication module 118 confirms the identity of the user 105 and allows them to login to computer system 101.

Thus, in one example, a U.S. user may provide a ten-digit phone number as the second identifier 109, along with a password or other credentials 108 in login attempt 107. The authentication module 118 will look at the determined login location 116 for the user, and determine whether that location (e.g. country code) and phone number match the first identifier 114 which itself includes the user's ten-digit phone number and country code. If the user is logging in from the United States, the second identifier+login location will match the first identifier. If the user is logging in from a country outside the United States, the second identifier+login location will not match the second identifier. In such cases, when the authentication module 118 determines that the second identifier 109 and login location 116 do not match the first identifier 114, the computer system may initiate a prompt 111 prompting the user to provide additional information regarding the user's location at the time of account creation.

Figure 5:
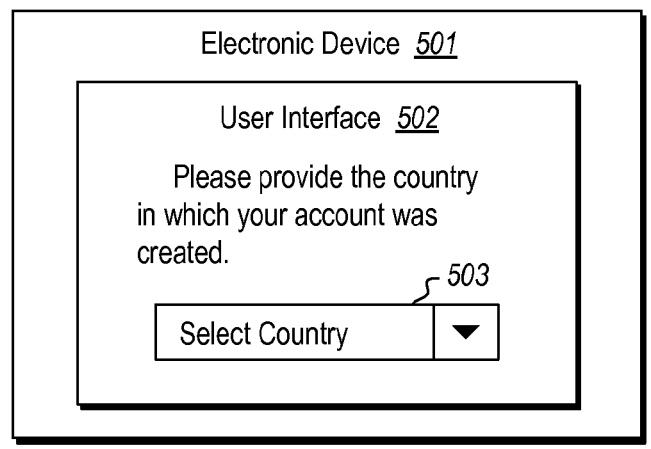
FIG. 5 illustrates an embodiment of an electronic device that includes a user interface that allows selection of a country.

For example, as shown in FIG. 5, if the second identifier 109 and login location 116 do not match the first identifier 114, the electronic device 501 may display a prompt 503 on the user interface 502 indicating that the user is to please provide the country in which their account was created. Accordingly, in the example above, if the user is a U.S. based user, and is attempting to login from another country (e.g. Egypt), the second identifier (ten-digit phone number)+determined login location (country code for Egypt) would not match the first identifier 114 which was the user's ten-digit phone number along with country code +1 for the United States. The prompt 503 allows the user to select the country in which they are based, or the country in which their account was created. Once the user selects United States from the prompt, the country code for the United States will be provided in addition to the user-supplied ten-digit phone number, and the authentication module 118 of FIG. 1 will determine that the user has been definitively identified, and the user will be allowed to login. In some cases, the computer system 101 may determine, from information associated with the login attempt, one or more likely locations associated with the first identifier and may prepopulate the prompt 503 with the determined likely locations.

It should be noted that although a ten-digit phone number has been described in various examples above being used as the second identifier 109, a token, an email address, a user-selected identifier, a biometric identifier or any other type of identifier may be used as the second identifier 109. Thus, in such examples, the first identifier 114 would include the token, email address, user-selected ID, biometric ID, etc. along with a country or state identifier. Then, when the user is logging in from other countries, as determined by the location determining module 115, and when they provide an alternative identifier, that identifier will be associated with a country code and if a match exists, the user will be authenticated. Still further, in some cases, the computer system 101 may assign a namespace to each country and may implement a flat string plus the namespace as the first identifier that is used to identify the user. In such cases, the second identifier would include the flat string without the namespace. Accordingly, the second identifier's flat string may include a phone number, email address, biometric identifier or any other type of identifier.

Turning now to FIG. 3, a flowchart is illustrated of a method 300 for validating the identity of a user. The method 300 will now be described with frequent reference to the components and data of environment 100.

Method 300 includes determining that a login account has been created for a user, the creation including generation of a first identifier for the user based on a user's determined location at the time of account creation (310). For example, computer system 101 may determine that login account 113 has been established for user 105. The creation of the user's login account 113 includes creation of first identifier 114 generated based on the user's login location 116. The communications module 104 of computer system 101 may receive login attempt 107 from the user 105 that includes a second, different identifier 109 and one or more login credentials 108 (320). The location determining module 115 of computer system 101 determines the location from which the login attempt was received (330) and, using the second identifier and the determined login location, the user account identifying module 117 identifies the user account corresponding to the user (340).

Figure 4:
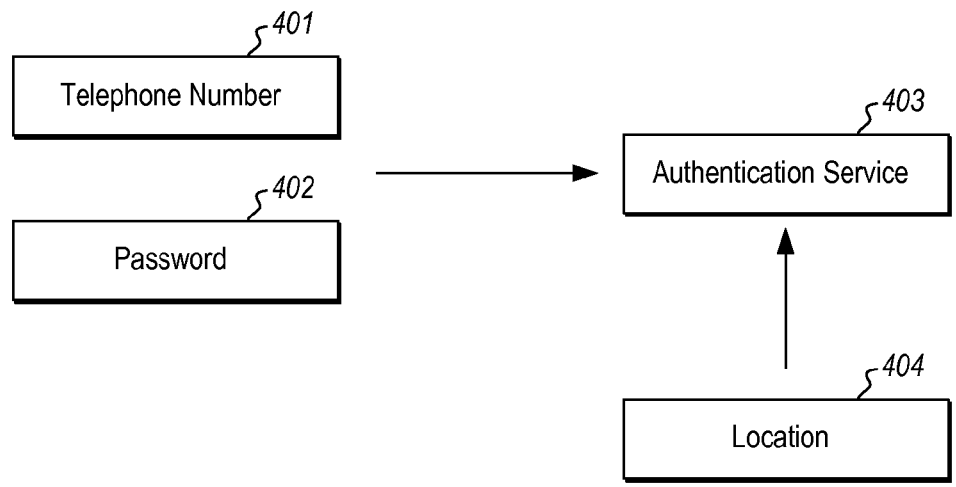
FIG. 4 illustrates an embodiment in which a telephone number, password and location are provided to an authentication service.

Method 300 further includes determining that the second identifier and login location do not match the first identifier (350) prompting the user to provide additional information associated with the user's location at the time of account creation (360). For example, as shown in FIG. 4, a user may provide a telephone number 401 (e.g. a ten-digit number with area code) and a password 402 to an authentication service 403. The authentication service 403 may further receive information regarding the location 404 from which the user is attempting to login. The authentication service may determine that the supplied telephone number 401 plus the location information 404 does not match a previously generated first identifier that stores the user's login information and location information. The user's electronic device 501 in FIG. 5 may display a prompt 503 to the user indicating that they are to select or enter the country in which their account was created.

Once the user has supplied a country, the authentication service 403 rechecks the user's login information and supplied country location with a first identifier that was previously generated. In some cases, the first identifier includes a user's identifier (e.g. a phone number, email address, biometric ID, user-selected ID, etc.) along with additional information associated with the user's location. This additional information associated with the user's location at the time of account creation may include a name of a country, a country code, a state or province name or code, GPS coordinates, or any other indication of location. This indication of location may provide a relative location or a more exact location for the user.

Still further, in some cases, when the login credentials include a password, the password may be used to disambiguate the user from other users. The password may be used in addition to the second identifier and login location in order to definitively identify the user. Thus, in such cases, the second identifier, the user's login location and the user's password may be used to differentiate the user from other users and positively determine which user they are. In this manner, methods, systems and computer program products are provided which validate the identity of a user. The methods, systems and computer program products use the login location to determine who user is, as opposed to other solutions that already know who the user is and are just determining whether the user is in an acceptable location. The embodiments described herein are designed to definitively identify the user based on the supplied credentials and a determined login location. As the identity of the user may be successfully disambiguated from that of other users, system security is increased as unauthorized users are prevented from logging in to the system. Moreover, data transmission security may be increased as positive user-to-user-account ties have been established, reducing the risk that data will be transmitted to an unauthorized entity.

Claims support: In one embodiment, a computer system is provided which includes at least one processor. The computer system performs a computer-implemented method for validating the identity of a user, where the method includes: determining that a login account 113 has been created for a user 105, the creation including generation of a first identifier 114 for the user based on a user's determined location at the time of account creation, receiving a login attempt 107 from the user that includes a second, different identifier 109 and one or more login credentials 108, determining the location 116 from which the login attempt was received, using the second identifier and the determined login location, identifying the user account 120 corresponding to the user and, upon determining that the second identifier and login location match the first identifier 114, authenticating the user.

Upon determining that the second identifier and login location do not match the first identifier, the computer system prompts the user to provide additional information regarding the user's location at the time of account creation. The computer system also determines, from information associated with the login attempt, one or more likely locations associated with the first identifier; and pre-populates a prompt with the determined one or more likely locations. The computer system further assigns a namespace to each country and implements a flat string plus the namespace as the first identifier that is used to identify the user.

In another embodiment, a computer system is provided which includes at least one processor. The computer system performs a computer-implemented method for validating the identity of a user, where the method includes: determining that a login account 113 has been created for a user 105, the creation including generation of a first identifier 114 for the user based on a user's determined location at the time of account creation, receiving a login attempt 107 from the user that includes a second, different identifier 109 and one or more login credentials 108, determining the location 116 from which the login attempt was received, using the second identifier and the determined login location, identifying the user account 120 corresponding to the user, determining that the second identifier and login location do not match the first identifier 114; and prompting 111 the user to provide additional information 110 associated with the user's location at the time of account creation.

In some cases, the login credentials comprise a password, and the password is used to disambiguate the user from other users, in addition to the second identifier and login location. Still further, in some cases, the computer system determines, from information associated with the login attempt, one or more likely locations associated with the first identifier and pre-populates a prompt with the determined one or more likely locations.

In still another embodiment, a computer system is provided which includes the following: one or more processors, a determining module for determining that a login account 113 has been created for a user 105, the creation including generation of a first identifier 114 for the user based on a user's determined location 116 at the time of account creation, a communications module 104 for receiving a login attempt 107 from the user that includes a second, different identifier 109 and one or more login credentials 108, a location determining module 115 determining the location 116 from which the login attempt was received, an identifying module 117 that uses the second identifier 109 and the determined login location 116 to identify the user account corresponding to the user, and an authentication module 118 that, upon determining that the second identifier and login location match the first identifier 114, authenticates the user 105.

The computer system further assigns a namespace to each country and implements a flat string plus the namespace as the first identifier that is used to identify the user. The computer system determines the location from which the login attempt was received comprises determining the location based on the area code portion of the phone number, the internet protocol (IP) address associated with the login attempt, or based on global positioning system (GPS) coordinates received from the user. In some cases, the first identifier 114 comprises a phone number with country code, and the second identifier 109 comprises a phone number without the country code. In such cases, determining the location from which the login attempt was received includes determining the location based on the area code portion of the phone number. Additionally or alternatively, determining the location from which the login attempt was received includes determining the location based on the internet protocol (IP) address associated with the login attempt or determining the location based on global positioning system (GPS) coordinates received from the user.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. At a computer system including at least one processor, a computer-implemented method for validating an identity of a user, the method comprising:
   determining that a login account has been created for a user, wherein the login account was created at least through generation of a first identifier for the user based on a determined location of the user at a time when the login account was created, the first identifier comprising a first phone number that includes a first country code;
   receiving a login attempt from the user that includes a second, different identifier and one or more login credentials, the second identifier comprising a second phone number that does not include a country code;
   determining a current location from which the login attempt was received;
   using the second identifier and the current location, identifying the login account that was created for the user; and
   upon determining that the second identifier and the current location match the first identifier, authenticating the user.

2. The method of claim 1, wherein determining the current location from which the login attempt was received comprises determining the current location based on an area code portion of the second phone number.

3. The method of claim 1, wherein determining the current location from which the login attempt was received comprises determining the current location based on an internet protocol (IP) address associated with the login attempt.

4. The method of claim 1, wherein determining the current location from which the login attempt was received comprises determining the current location based on global positioning system (GPS) coordinates received from the user.

5. The method of claim 1, further comprising:
   upon determining that the second identifier and the current location do not match the first identifier, prompting the user to provide additional information regarding the determined location of the user at the time when the login account was created.

6. The method of claim 5, further comprising:
   determining, from information associated with the login attempt, one or more likely locations associated with the first identifier; and pre-populating a prompt with the determined one or more likely locations.

7. The method of claim 1, further comprising:
assigning a namespace to each country; and
implementing a flat string plus the namespace as the first identifier that is used to identify the user.

8. The method of claim 7, wherein the second identifier comprises the flat string without the namespace.

9. The method of claim 1, wherein the login account is created as part of an application accessed by the user.

10. At a computer system including at least one processor, a computer-implemented method for validating an identity of a user, the method comprising:
determining that a login account has been created for a user, wherein the login account was created at least though generation of a first identifier for the user based on a determined location of the user at a time when the login account was created, the first identifier comprising a first phone number that includes a first country code;
receiving a login attempt from the user that includes a second, different identifier and one or more login credentials, the second identifier comprising a second phone number that does not include a country code;
determining a current location from which the login attempt was received;
using the second identifier and the current location, identifying the login account that was created for the user;
determining that the second identifier and the current location do not match the first identifier; and
prompting the user to provide additional information associated with the determined location of the user at the time when the login account was created.

11. The method of claim 10, wherein the additional information associated with the determined location of the user at the time when the login account was created comprises a name of a country.

12. The method of claim 10, wherein the one or more login credentials comprise a password, and wherein the password is used to disambiguate the user from other users, in addition to the second identifier and the current location.

13. The method of claim 10, further comprising:
determining, from information associated with the login attempt, one or more likely locations associated with the first identifier; and
pre-populating a prompt with the determined one or more likely locations.

14. A computer system comprising the following:
one or more processors;
one or more computer-readable hardware storage media having stored thereon computer-executable instructions that are executable by the one or more processors to cause the computing system to perform a method for validating an identity of a user, the method comprising:
determining that a login account has been created for a user, wherein the login account was created at least through generation of a first identifier for the user based on a determined location of the user at a time when the login account was created, the first identifier comprising a first phone number that includes a first country code;
receiving a login attempt from the user that includes a second, different identifier and one or more login credentials, the second identifier comprising a second phone number that does not include a country code;
determining a current location from which the login attempt was received;
using the second identifier and the current location, identifying the login account that was created for the user; and
the system being configured for, upon determining that the second identifier and the current location match the first identifier, authenticating the user, and upon determining that the second identifier and the current location do not match the first identifier then prompting the user to provide additional information associated with the determined location of the user at the time when the login account was created.

15. The computer system of claim 14, wherein the method further comprises:
assigning a namespace to each country; and
implementing a flat string plus the namespace as the first identifier that is used to identify the user.

16. The computer system of claim 14, wherein determining the current location from which the login attempt was received comprises determining the current location based on an area code portion of the second phone number, an internet protocol (IP) address associated with the login attempt, or based on global positioning system (GPS) coordinates received from the user.

17. A method for validating an identity of a user, the method being implemented at a computer system that includes one or more processors, the method comprising:
assigning a namespace to each country;
determining that a login account has been created for a user, wherein the login account was created by generating a first identifier that was based on a determined location of the user at a time when the login account was created, and wherein a flat string plus the namespace were also implemented as a part of the first identifier;
receiving a login attempt from the user that at least includes both a second identifier and one or more login credentials, the second identifier being different than the first identifier;
determining a current location of the user when the login attempt was received;
using the second identifier and the current location, identifying the login account that was created for the user; and
upon determining that the second identifier and the current location match the first identifier, authenticating the user.

18. The method of claim 17, wherein the second identifier also comprises the flat string, and wherein the second identifier does not include the namespace.

19. A computer system, comprising:
one or more processors; and
one or more computer-readable hardware storage media having stored thereon computer-executable instructions that are executable by the one or more processors to cause the computer system to validate an identity of a user by causing the computer system to:
assign a namespace to each country;
determine that a login account has been created for a user, wherein the login account was created by generating a first identifier that was based on a determined location of the user at a time when the login account was created, wherein the first identifier comprises a first phone number that includes a first country code, and wherein a flat string plus the namespace were also implemented as a part of the first identifier;

receive a login attempt from the user that at least includes both a second identifier and one or more login credentials, the second identifier being different than the first identifier, the second identifier comprising a second phone number that does not include a country code;

determine a current location of the user when the login attempt was received;

using the second identifier and the current location, identify the login account that was created for the user; and upon determining that the second identifier and the current location match the first identifier, authenticate the user.

20. The computer system of claim 19, wherein the second identifier also comprises the flat string, and wherein the second identifier does not include the namespace.

* * * * *